United States Patent Office 3,660,560
Patented May 2, 1972

---

3,660,560
1-p-CHLOROPHENYL - 1,3,3-TRIMETHYL-1,3-PRO-
PANE-DIOL OR THE TREATMENT OF DEPRES-
SIVE STATES
Raymond Valette, Paris, France, assignor to
Albert Rolland S.A., Paris, France
No Drawing. Application Aug. 2, 1968, Ser. No. 749,574,
which is a continuation-in-part of application Ser. No.
262,849, Mar. 5, 1963. Divided and this application
Nov. 20, 1970, Ser. No. 91,529
Int. Cl. A61k 27/00
U.S. Cl. 424—343        3 Claims

ABSTRACT OF THE DISCLOSURE

This invention relates to a pharmaceutical composition containing in association with a physiologically inert carrier from 1 to 95% by weight of 1-p-chlorophenyl-1,3,3-trimethyl-1,3-propane-diol, as an active ingredient.

---

This is a division of patent application Ser. No. 749,-574 filed on Aug. 2, 1968, which is a continuation-in-part of patent application Ser. No. 262,849 filed on Mar. 5, 1963, now abandoned.

The present invention is concerned with a pharmaceutical composition containing in association with a physiologically inert carrier from 1 to 95% by weight of 1-p-chlorophenyl-1,3,3-trimethyl-1,3 - propane - diol as an active ingredient with antidepressive properties.

1-p-chlorophenyl-1,3,3-trimethyl - 1,3 - propane-diol, of the formula

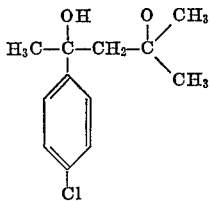

hereinafter called Rd 292 is a well known compound which has already been prepared by the applicant. Rd 292 can be synthesized either from diacetone-alcohol, or beta-(p - chlorophenyl) - beta - hydroxybutyric acid ethyl ester as starting materials.

In the above cited continuation-in-part it has been indicated that asymmetric compounds of the formula

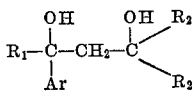

(the methylene group —$CH_2$— being taken as a center of symmetry with regard to $R_1$ equal to $R_2$ or $R_1$ being different from $R_2$) wherein $R_1$ and $R_2$ are different lower alkyl radicals and Ar represents an aryl radical which may be a phenyl or a para-halogen substituted phenyl radical, have more valuable therapeutic properties than symmetric ones ($R_1=R_2$).

For instance, asymmetrical compounds are less toxic, possess more accentuated effects, and potentialize to a greater extent than their symmetrical homologues the hypnotic action of Nembutal in mice. Some comparison data are indicated in Table I.

TABLE I

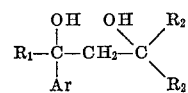

| Ar | $R_1$ | $R_2$ | $LD_{50}$ orally [1] (mg./kg.) | Sleeping time ratio [2] |
|---|---|---|---|---|
| p-Cl—$C_6H_4$ | $CH_3$ | $CH_3$ | 940 | 3/08 |
| p-Cl—$C_6H_4$ | $CH_3$ | $C_2H_5$ | 2,225 | 10/5 |
| p-$CF_3$—$C_6H_4$ | $CH_3$ | $CH_3$ | 770 | 5/55 |
| p-$CF_3$—$C_6H_4$ | $CH_3$ | $C_2H_5$ | 1,400 | 5/68 |

[1] In mice.
[2] Potentialization of Nembutal in mice:

Ratio: $\dfrac{\text{Sleeping time in animals treated by 100 mg./kg. of bitertiary } \beta\text{-diol}}{\text{Sleeping time in control animals}}$ The applicants have surprisingly discovered that from the symmetrical derivatives, the Rd 292 has an originality of action which renders it at least as advantageous as the asymmetrical derivatives.

The Rd potentialises the effects of the amphetamine and therefore has anti-depressive properties.

However, it has no anti-reserpine action, in contradistinction to the major anti-depressors; it is distinguished from the tricyclic derivatives (imipramine, for example), by the absence of anticholinergic effects. Finally, there is no inhibitive activity of the mono-aminooxidase. Therefore, it occupies, like thymoanaleptic, a place apart.

For preparing pharmaceutical compositions from the physiologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents; it can also be an encapsulating material. In powders, the carrier is a finely divided solid which is in admixture with the finely divided compound. In the tablet the compound is mixed with carrier having the necessary binding properties in suitable proportions and compacted in the shape and size desired. The powders and tablets preferably contain from 1 to 95% by weight of the active ingredient. Suitable solid carriers are magnesium carbonate, magnesium stearate, talc, sugar, lactose, pectin, dextrin, starch, gelatin, adraganth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions, or in oil. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is sub-divided in unit doses containing appropriate quantities of the compound, the unit dosage form can be a package preparation, the package containing discrete quantities of preparation, for example, packeted powders of vials or ampules.

The unit dosage form can be a capsule, cachet or tablet itself or it can be the appropriate number of any of those in packaged form. The quantity of compound in a unit dose of preparation may be varied or adjusted from 50 to 400 mg. of Rd 292 according to the particular application and the potency of the active ingredient. In therapeutic use, the preparations are administered at the initial dose of about 5 mg. per kilogram of body weight daily. The dosage, however, may be varied depending upon the requirements of the patient.

The Rd 292 is administered orally in the form of gelulas of 125 mg. containing 100 mg. of active ingredient. With the gelulas, the usual dosage is, in the adult, from 2 to 6 gelulas per day and, in children, from 1 to 3 gelulas per day, for 20 to 40 days.

Two injectable preparations may be obtained: one, 100 mg. of Rd 292 in association with an excipient (propylene-glycol) in a sufficient quantity for a capsule of 1 ml., the other, 300 mg. of Rd 292 for a capsule of 3 ml. (same excipient).

Rd 292 may also be administered in the form of tablets containing 250 mg. of active ingredient or of drops.

Other advantages and characteristics according to the invention will be more readily understood by reading the following description of non-limiting examples.

PREPARATION EXAMPLE 1

1-p-chlorophenyl-1,3,3-trimethyl-1,3-propane-diol

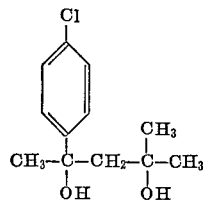

is prepared, using starting material ethyl beta-(p-chlorophenyl)-beta-hydroxybutyrate of the formula

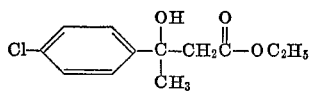

which has been prepared by the Reformatsky reaction, i.e. by condensing ethyl bromoacetate with p - chloroketophenone.

The first stage of the reaction of the invention is carried out in a spherical flask into which 40 g. of magnesium ships have been introduced. A trace of iodine is added and a dry nitrogen atmosphere is maintained.

The product is covered with 300 cc. of anhydrous ether and a few cc. of methyl iodide are added. The reaction is started by gentle heating, and the remainder of the methyl iodide is then introduced, i.e. 50 cc. (0.8 mol.) in 100 cc. of ether. At then end of the reaction, there is obtained a clear solution containing a slight blackish suspension.

The solution is made up to a volume of 500 cc.

The condensation reaction is thereafter carried out in a second spherical flask containing 2/10 mol. of hydroxy ester and 300 cc. anhydrous ether. The product is cooled and the magnesium solution previously prepared is run into the flask with stirring.

The blocking of the hydroxyl group can be followed by determining the volume of methane liberated. When the evolution of methane ceases, the reaction proper commences. It is less vigorous and the temperature remains constant. The flask is left at ambient temperature for 12 hours and the progress of the reaction is determined by titrating the unreacted organomagnesium compound.

When the reaction is complete, the hydrolysis is carried out by pouring the ethereal solution onto a mixture of 1 kg. of ice and 1 litre of water containing 100 g. of ammonium chloride. The decanted ethereal solution is taken up with a 5% sulphuric acid solution and washed with water containing sodium bicarbonate and again with water, to neutrality and dried over sodium sulphate.

The ether is distilled off and the oily residue is dried in vacuo. Crystallisation starts at once, and is allowed to continue for 24 hours, after which the product is separated and twice treated with petroleum ether. There are thus obtained 34 g. (yield 73%) of a product which, on recrystallisation from petroleum ether, takes the form of a microcrystalline powder, M.P. 76.5° C.

PREPARATION EXAMPLE 2

The magnesium compound of methyl bromide is prepared under the normal conditions and with the customary precautions in such a quantity that 1 molecule of methylmagnesium bromide is had after titration.

This solution is slowly conveyed by gravity or under pressure into a sealed flask connected to a volume meter and provided with a means of agitation, containing a molecule of diacetone-alcohol in 150 to 200 cc. of anhydrous ether, at ambient temperature.

After the introduction of the magnesium compound, the reaction commences with the appearance in the liquid of a white suspension formed of diacetone-alcohol whose hydroxyl group is blocked, and release of methane gas.

Towards the end of the introduction, the release is supervised by adding the magnesium compound by fraction of a few drops. As soon as an addition no longer moves the needle of the volume meter, the addition of magnesium compound is stopped. The temperature is then slowly raised to reflux, for the sole purpose of totally driving out the hydrocarbon in solution in the ether and of controlling the volume released, but this is not necessary for the blocking reaction.

The reactional mixture is left to cool to ambient temperature, then 1 molecule (exactly determined by titration) of parachlorobenzene-magnesium bromide is slowly introduced, with brisk stirring.

The white suspension disappears gradually and towards the end of the reaction, the complex appears in the form of viscous trails. After the introduction of the magnesium compound, the temperature is raised to reflux, this temperature is maintained for one hour, then the complex formed is decomposed by water and the preparation is terminated according to the conventional method, by acidifying the mixture, decanting the ethereal layer and washing said latter.

After evaporation of the ethereal fraction, a thick oil is obtained which crystallises gradually. The Rd 292 is obtained with a yield of 52%.

TOXICITIES

The acute toxicity of Rd 292 was studied in the rat (Wistar strain) and the mouse (Swiss strain), the product being administered:

Orally, in suspension in a syrup of gum arabic on batches of 20 animals (ingestion by oesophagical probe);

Intraveneously (injection into the vein of the mouse's tail for 5 seconds for 0.1 ml.) of a composition comprising:

Rd 292: 2 g.
Polyoxyethylene sorbitan monooleate: 12 ml.
Distilled water q.s.p.: 100 ml.

oligoelement for a pH of 4.8, the control batch receiving only distilled water with the oligoelements and the polyoxyethylene sorbitan monooleate.

TABLE II.—ACUTE TOXICITY

|  | Wistar Rats of 200±20 g. | | Swiss mice of 18 to 24 g. | |
| --- | --- | --- | --- | --- |
|  | Males | Females | Males | Females |
| $LD_{50}$ (per os) mg./kg. | 1,200 | 1,250 | 940 | 995 |
| $LD_{50}$ (I.V.) mg./kg. |  |  | 230 | 240 |

The chronic and semi-chronic toxicological tests followed by histophatological examinations shows the good tolerance of the Rd 292 in the rat, at doses of 10, 20 and 40 times the strong human therapeutic dose (S H T D) which is equal to 5 mg./kg./day.

The particularities of the action of the RD 292 in the animal are indicated hereinafter:

EFFECT ON SPONTANEOUS BEHAVIOUR

In the mouse.—At doses of 100 and 200 mg./kg. administered orally, the Rd 292 provokes an excitation proportional to the dose. In the animals placed in a rotating cage actimeter, there is an increase in motility. At 500 mg./kg., a considerable depression with narcosis is obtained.

In the cat.—At doses of 100 and 200 mg./kg., a hyperactivity without aggressiveness is noted despite modifications in the muscular tonus for the strongest dose.

EFFECT ON BARBITURIC SLEEP

At 50 to 100 mg./kg., the Rd 292 potentialises in highly significant manner the sleep caused in the mouse by 50 mg./kg. of sodium Mebubarbital.

ANTICONVULSIVE EFFECT

At a dose of 100 mg./kg., the Rd 292 eliminates in 75% of the cases the tonic seizures provoked by Pentetrazole (6,7,8,9-tetrahydro-5H-tetrazoloazepine) in the mouse.

At 100 mg./kg., the Rd 292 significantly extends the survival time of mice subjected to a slow perfusion of Strychnine sulfate.

RELAXING MEDULLAR EFFECT

Traction test

At 225 mg./kg., the Rd 292 eliminates the clawing reflex in 50% of the mice.

Study of the medullary reflexes in the cat

At 20 mg./kg., the Rd 292 lowers a polysynaptic reflex: ipsilateral flexion reflex without modifying a monosynaptic reflex: the patellar reflex.

SEARCH FOR ANTIDEPRESSIVE CHARACTERISTICS

Potentialisation of the effects of amphetamine in the rat

At 100 and 200 mg./kg., the Rd 292 increases and prolongs the chewing movements caused by 10 mg./kg. of amphetamine. This property is shared by the antidepressants of the group of imipramine [5-(3-dimethylaminopropyl)-10, 11-dihydro-5H-dibenz(b,f)azepine]. The Rd 292 has no anti-reserpine action (it does not antagonise the central hypothermizing effect of the reserpine in the mouse.) It is not anticholinergic (it does not oppose the effects of Tremorine in the mouse).

The Rd 292 is not an inhibitor of the oxidase monoamine according to

Tests in vitro by the Warburg method (substrate used: Tyramine, 4-hydroxyphenethylamine), and Tests in vivo by the Weissbach method (substrate used: kynurenine, 3-anthramiloylalanine).

In the mouse, the 5-hydroxy-tryptophane causes, in the presence of an MAOI, phenomena of excitation due to the accumulation of serotonin; this effect is not observed with the Rd 292.

SEARCH FOR PSYCHOANALEPTIC CHARACTERISTICS

Effect on exploration

The Rd 292 at 50, 100, 200 mg./kg. increases the reaction of exploration assessed in the mouse by the "perforated plank" method.

Action on the conditioned reflexes

The Rd 292 facilitates the acquisition of the conditioned reflexes in the rat in the case of avoidance conditioning: (shuttle-box), maze conditioning and operating conditioning.

Action on the encephalogram study of the rabbit

The Rd 292 favours the persistance of a high level of vigilance with a discrete reduction in the threshold of reticular or auditory stimulation.

In summary, according to the analysis of the pharmacological tests, the psychotropic action of the Rd 292 does not seem to be univocal. In fact, distinction was able to be made.

On the one hand, of the sedative properties (narcosis at very strong doses, reduction in the clawing "agrippement" reflex, potentialisation of barbituric sleep, anticonvulsant effect, medullar relaxing effect), and On the other hand, of the stimulant properties (appearance of state of alertness in the mouse, the cat, increase of the motility and exploration, potentialisation of the effects of amphetamine in the rat, improvement in different conditioning in the rat, electrical cortical activity which is rather more desynchronised in the rabbit).

The clinical tests have confirmed the pharmacological studies. Certain of the observations made on 22 "non-organic" patients and on 18 patients suffering from various organic affections are reproduced hereinafter.

In the non-organic patients, the most manifest improvements relate to neuro-vegetative disorders, sleep disorders, disorders in the character, pain, physical or psychic asthenia, thus to the different elements of the symptomatology of the simple depressive syndrome, as may be ascertained in the following observations:

OBSERVATION 39

Man, 41 years, is admitted to hospital for a check-up for head-aches and diffuse pains in the lower limbs. A clinical examination is entirely negative; the neuro-psychiatric examination shows the existence of an agressive tendency in this patient, which is manifested in relation with the elements of family life.

This is why, in a sedative and psychostimulant aim, 100 mg. Rd 292 at the dose of 1 gelula three times per day, is admistered to this patient for a period of 17 days.

The clinical tolerance of the medication is excellent; the patient declares himself to be much improved by this treatment. In conclusion: Neurotic depression with neuro-vegetative disequilibrium; good clinical tolerance and satisfactory efficiency of the medication.

OBSERVATION 19

Woman, 52 years, admitted to hospital for a check-up for a febrile state at 39°, accompanied by sweating, diffuse epigastric pains and divers pains. The clinical examination is negative and the infectious syndrome will attenuate spontaneously in a few days.

Furthermore, this patient has head-aches and insomnia, as well as depressive manifestations which appear in relation with her menopause.

In conclusion: climateric depression; it is in this aim that therapeutics by 100 mg. Rd. 292, at a dose of 3 gelulas per day for 21 days, is instituted. The clinical tolerance of the medication is very satisfactory; a clear improvement is noted in the sleep, clear tranquillisation.

In organic patients.—The depressive tendency has for its origin diverse affections:

Valvular cardiopathy (6 cases)

Anxiety and sleep disorders dominate and the Rd 292 has given excellent results concerning these two symptoms.

Anginous or infarct syndromes (4 cases)

The neuro-vegetative disorders are frequent, mostly cardiac but also digestive. The Rd 292 has a certain action on them but it is sometimes incomplete. When an anxiety is noted, its action is manifest.

OBSERVATION 5

Man, 50 years, admitted to hospital for manifestations of cardiopulmonary insufficiency having caused an interruption of work for several months.

These manifestations consist in particular in precordialgesiae which are, however, for the most part atypical and not bringing about angor. However, the electrocardiogram confirms the existence of an anterolateral coronarite. It therefore seems that the manifestations are of two types, some in relation with the coronarite and the others in relation with an inorganic cause and particularly a neuro-vegetative dystonia which is objectified by an associated functional symptomatology.

In order to fight against these manifestations, this patient receives 1 100 mg. gelula of Rd 292 three times a day, for 20 days.

The tolerance of the medication is excellent. The clinical efficiency is very satisfactory during hospitalisation as the functional symptomatology is very clearly modified. In conclusion: Anxious manifestations of dystonic origin in a coronary patient; excellent tolerance and very satisfactory clinical efficiency of the medication.

Substantial arterial hypertension (2 cases)

The results are hardly able to be interpreted; one of these cases had to be transferred to psychiatrics after 4 days for delirious manifestations of interpretative and cenesthesic type; as for the other, it was a question of a labile hypertension, accompanied by sleep disorders, head-aches and cervico-dorsal algesiae having reacted well to the treatment by the Rd 292.

OBSERVATION 16

Woman, 70 years, admitted to hospital for a check-up for vertiginous and lipothymic manifestations, not accompanied by losses of consciousness, occurring in a patient who has a slightly high blood pressure.

The clinical examination reveals nothing more than a slight cardio-vascular sclerosis secondary to this high blood pressure.

In association with the vaso-dilator treatment, the patient receives a sedative treatment by 100 mg. Rd 292, at a dose of 1 gelula, three times a day, for 15 days.

The clinical tolerance of the medication is excellent; a very clear improvement is noted in the previously disturbed sleep.

In conclusion.—Substantial arterial hypertension; fairly considerable functional manifestations; clinical tolerance of the medication very good; satisfactory clincal efficiency.

Hyperthyroids (2 cases)

The Rd 292 was efficient in these two particular cases: one, a Basedowian thyreosis presenting sleep disorders which disappeared under treatment; the other, a delirious hypochondria, accompanying a hyperthyroidia whose manifestations are attenuated and disappear completely.

OBSERVATION 34

Woman, 52 years, is admitted to hospital for a congestive cardiac insufficiency with edema of the lower limbs and anasarca schema.

The clinical examination is straight away directed on a thyroidian note and in addition to the tachyarrythmia, one has ascertained the existence of a fever, a trembling, a state of agitation, episodes of diarrhea, which orient towards a hyperthyroidia which will subsequently be confirmed by the test with radioactive iodine.

Furthermore, this patient has a very particular neuro-psychiatric schema; she complains in particular of sensations of water running over the body. These manifestations are in relation with a delirious hypochondria whose relationship with the Basedow's disease it is difficult to confirm.

In association with the toni-cardiac and symptomatic treatment of the hyperthyroidia, the patient will receive one gelula, twice a day, for 32 days, of Rd 292; the clinical tolerance of the medication is very satisfactory; the clinical efficiency good, since the hypochondriac manifestations progressively attenuate and disappear.

In conclusion.—Delirious hypochondria; good tolerance and satisfactory clinical efficiency of the Rd 292.

Congential cardiopathies (2 cases)

In these two cases of inter-auricular communication, the considerable disorders in sleep react very well to Rd 292, in the same way as in one case of functional symptomatology, without relationship with malformation and anxiety.

Collagenosis (1 case)

A depressive syndrome secondary to a probable dermatomyositis, substantially translated by anxiety and disinterest, treated by Rd 292, has shown a clear improvement in the anxiety and a renewal of interest of the patient for the results of his treatment.

Asthma (1 case)

This asthma, the first crises of which go back 24 years, is accompanied by a chronic pulmonary insufficiency. As the crises were notably influenced by the emotive factors, the Rd 292 is prescribed with good results: sleep, in particular, is restored.

In these 18 cases, various organic attacks have caused a depressive state whose symptomatology concerns in particular functional manifestations without relation with the causal affection and the sleep disorders. The Rd 292 gave, in these circumstances, very good results which prove the justice of its prescription in association with etiological treatments.

In total, in the two groups of patients, the symptoms most favourably influenced by the treatment are sleep disorders, anxiety, neuro-vegetative manifestations, and disorders in the character.

What is claimed is:

1. A method for the treatment of depressive states which comprises administering daily to patients effective amounts in dosage unit form of 1-p-chlorophenyl-1,3,3-trimethyl 1,3-propane-diol over a period of about 20 to 40 days.

2. A method according to claim 1 wherein each unit dosage contains from about 50 to 400 mg. of the compound 1-p-chlorophenyl - 1,3,3 - trimethyl - 1,3 - propane-diol.

3. A method according to claim 2 wherein each unit dosage contains from about 100 to 300 mg. of the compound.

References Cited

FOREIGN PATENTS 1,324,391    3/1962    France.

STANLEY J. FRIEDMAN, Primary Examiner